(12) United States Patent
Perez-Cordova

(10) Patent No.: US 7,481,878 B1
(45) Date of Patent: Jan. 27, 2009

(54) ACTIVATED CLAYS FROM OIL CONTAMINATED DRILL CUTTINGS

(75) Inventor: Ramon Perez-Cordova, Lerma (MX)

(73) Assignee: Racional Energy & Environment Co., Reno, NV (US)

(*) Notice: Subject to any disclaimer, the term of this patent is extended or adjusted under 35 U.S.C. 154(b) by 713 days.

(21) Appl. No.: 11/161,706

(22) Filed: Aug. 12, 2005

(51) Int. Cl.
C04B 7/24 (2006.01)
C04B 7/36 (2006.01)

(52) U.S. Cl. .................. 106/745; 588/257; 210/510.1; 202/91; 203/35; 203/36

(58) Field of Classification Search .......... 106/745; 175/66; 588/257; 210/510.1; 202/91; 203/35, 203/36
See application file for complete search history.

(56) References Cited

U.S. PATENT DOCUMENTS 5,660,806 A * 8/1997 Fristad et al.
6,668,947 B2 * 12/2003 Cordova
6,978,851 B2 * 12/2005 Perez-Cordova ............ 175/206

* cited by examiner

*Primary Examiner*—Paul Marcantoni
(74) *Attorney, Agent, or Firm*—Daniel N. Lundeen; Lundeen & Lundeen, PLLC

(57) ABSTRACT

A method for the preparation of activated clays and cement additives from contaminated drill cuttings is provided. The substrate can be mixed with a mineral acid in a first reactor. The acidified substrate is then mixed with alkaline earth in a second reactor. The reactions are exothermic and provide heat to vaporize the contaminants, reaction products, and water. Recoverable constituents in the vapor can be condensed in a vapor collection system. The treated substrate can be heated and/or further reacted with acid, resulting in the formation of activated clays. For production of cement additives, the treated substrate can then be heated in a kiln and combined with cement clinker material for the preparation of cement and/or concrete.

22 Claims, 2 Drawing Sheets

ACTIVATED CLAYS FROM OIL CONTAMINATED DRILL CUTTINGS

FIELD OF THE INVENTION

This invention relates to a method for the treatment of oil-contaminated solid substrates for environmentally acceptable removal of organic contaminants and activation of clay constituents. More particularly, this invention relates to a method for treating drill cuttings with acid and heat to form activated clays useful as a filtering or absorbing medium or as a component in cement.

Clays which can be "activated" are commonly grouped under the name "smectite." Smectite clays, generally referred to as bentonite (a mineral with a high content of smectite), include hectorite, saponite, and montmorillonite. These clays are characterized by substitutions of metal ions within their structure, and are therefore electrically unbalanced. Bentonite is a common additive in drilling mud. Other types of clays useful as activated clays or catalysts include palygorskite (attapulgite) clays, kaolin clays, and others. Additional clays, minerals, and rock formations encountered during drilling operations are recovered as drill cuttings.

U.S. Pat. No. 6,602,816 to Hatano et al. describes a method to activate smectite clays. Smectite clays are mined and separated to remove impurities such as quartz, opal, and iron. The clays are then milled to form 1 to 10 micron sized particles, mixed with an acid-decomposing inorganic compound, granulated to form 10 to 45 micron particles, treated with acid, and washed to form the activated clay. Also disclosed is the advantageous presence of gypsum in the resulting mixture. The mining, separating, milling, mixing, and granulating steps each increases the cost to produce the activated clay. Other methods to activate clays are disclosed in U.S. Pat. No. 4,717,699 to Mickelson, and U.S. Pat. No. 5,908,500, to Brooks et al. (disclosing clay mixtures suitable for activation, such as a smectite-opal mixture).

Oil-based and water-based drill cuttings are generally regarded as controlled or hazardous waste. As such, they can generally be disposed of in one of two ways: (1) decontamination treatment; or (2) hazardous waste controlled landfill. Hazardous waste is considered a threat to the environment due to risk of surface and subsurface water pollution, air pollution, and interrupting the equilibrium of the ecosystem. The use of controlled landfills is usually not an environmentally acceptable option, as the contaminated solid waste is only transferred from one place to another, and the ultimate need for decontamination is postponed.

There are several technologies available to treat hazardous wastes. Each has advantages and limitations depending upon the concentration and type of contaminant, the matrix in which the contaminant is dispersed, and the locations where the cuttings are generated and are to be disposed of, which can be the same or different. Factors considered in selecting treatment methods include: the handling and treatment costs, process time, contaminant locations, such as for example, ecologically protected areas, nearby water bodies, human residences, deserts, to name a few, and finally the total treatment time.

Oil and gas exploration involves drilling wells at different depths throughout different geological strata including clay, rock, sand, shale, empty underground salt mines, brine and water tables. Well drilling requires a drilling fluid, or mud, having various physical functions such as: (1) cooling and lubrication of the drill bit; (2) formation of a filter cake for temporarily 'casing' the wellbore; (3) carrying the drill cuttings from the bit to the surface; and (4) preventing blowout of reservoir fluids. The solid materials cut by the bit are known as drill cuttings. Drilling mud can be a fluid of physical-chemical compounds with specific rheological characteristics to cover all the needs of the well as the different geological layers, depths and extreme pressure of natural fluids are met.

There are two principal types of mud: (1) oil-based mud (also known as inverse emulsion mud); and (2) water-based mud. The exact formulations vary according to the technology of each supplier and the general characteristics of each well in each field. Because these formulations are generally expensive, the fluids are typically recycled for continued use. Before recirculation, their formulation is often adjusted to replace compounds lost during the process. The composition of drilling muds can include the following compounds: (1) bentonite; (2) barite; (3) diesel or other oil; (4) polymers; (5) sodium and potassium chlorides; and (6) water.

Water-based mud can include chlorides, but does not use diesel or oil. Oil-based muds generally use more diesel than water, and may also include hydrocarbons to enhance the lubricating properties of the fluid. As used herein, the term "oil-based mud" includes synthetic muds that may be classified separately even though they contain appreciable amounts of hydrocarbons. Oil-based mud can include refined hydrocarbons in lieu of diesel. Even though oil-based muds can be cheaper and have operating advantages, water-based mud is frequently used because water-based muds are generally more easily disposed. In all cases, the mud is a stable physical emulsion to prevent separation of components that may have different densities and other physical-electrical characteristics. Mud can be sticky and elastic, like gum, without losing fluid qualities. As the contaminated oil-based drill cuttings lose water, they become stickier in nature.

During drilling, the mud is injected through the center of the drill string to the bit and exits to the surface in the annulus between the drill string and the wellbore, fulfilling, in this manner, the cooling and lubrication of the bit functions, casing of the well, and transporting the drill cuttings to the surface. At the surface, the mud can be separated from the drill cuttings for reuse, and the drill cuttings can be disposed of, usually in controlled landfills.

Separation of the mud from the drill cuttings is not perfect since the cuttings retain part of the drilling mud in concentrations that can vary between 25 and 50 weight percent, or greater. Thus, drill cuttings can be considered hazardous waste, depending on the residual components and concentration of the mud. Because of the presence of hazardous compounds such as diesel, chlorides, polymers, etc., environmental concerns require that drill cuttings showing contaminant characteristics be treated before disposal into the environment. Several known prior art technologies for the treatment of drill cuttings contaminated with oil-based muds include: (1) incineration; (2) stabilization and encapsulation; (3) thermal desorption; (4) chemical oxidation; (5) biochemical degradation; and (6) controlled landfills. The criteria used in selecting the best technology include: (1) environmental reliability (environmental risk); (2) specific environmental requirements, by legislation as well as geographical location; (3) limitations of each technology (reliability of the equipment and processes); (4) costs; (5) process speed vs. cuttings generation speed; (6) available space for treatment; (7) characteristics of the final disposal site; and (8) logistics.

Biochemical degradation, as disclosed in U.S. Pat. No. 5,039,415 to Smith, typically requires constant supervision and control of the process, is time consuming, and may take several years. Disposal in controlled landfills is less attractive because the problem is not solved, and may not be attractive for offshore drilling applications.

Examples of incineration processes include U.S. Pat. No. 1,444,794 to Kernan; and U.S. Pat. No. 4,606,283 to Des-Ormeaux et al. The main limitation of incineration lies in operational costs and process control difficulties due to narrow stoichiometric operating ranges that are hard to maintain when contaminant concentrations are variable. Moreover, incineration processes can be energy intensive as the entire matrix is heated to combustion temperatures, and many constituents have high thermal coefficients. Flexibility of incineration equipment in the field can be low and logistical costs can be high.

Thermal desorption, as disclosed in U.S. Pat. Nos. 5,228,804 to Balch, 5,272,833 to Prill et al. and 5,927,970 to Pate et al., presents limitations including low thermal efficiency, poor process control, low flexibility, high investment and operating costs, and low feasibility for in situ projects. Thermal efficiency of thermal desorption is lower than for incineration as the matrix is indirectly heated, increasing investment, maintenance and operational costs, while providing poor process control. The viscoelastic nature of drill cuttings create processing difficulties because the drill cuttings may stick to walls and other equipment surfaces, reducing thermal transmission by decreasing the inner diameter of the drum with less productivity and/or quality. Thermal desorption requires treatment of recovered gases, typically by condensation.

Prill et al. disclose supplying indirect heat to hydrocarbon materials and combusting the hydrocarbons and other combustibles at temperatures between 371° and 427° C. (700° and 800° F.). Balch discloses recovering hydrocarbon contaminants from contaminated soil through the injection of heated air into an ex situ body to vaporize volatile hydrocarbons.

Several patents disclose rotary kilns for the removal of volatile hydrocarbons and other contaminants from solids, such as drill cuttings or sludge. Representative references include U.S. Pat. Nos. 5,152,233; 5,199,354; 5,302,118; and 5,378,059. Rotary kilns generally provide indirect heat to volatilize hydrocarbons absorbed on solids for disposal. Recovery of oil from refinery sludge by steam distillation is disclosed in U.S. Pat. No. 4,014,780 to McCoy. Specifically, sludge materials are passed downwardly through a series of rotating gates where the materials are contacted with steam. The steam vaporizes volatile hydrocarbons contained within the sludge and/or substrate as the vapor rises within the chamber.

Chemical oxidation is disclosed in U.S. Pat. No. 5,414,207 to Ritter, for example. In this approach, lime preconditioned with a hydrophobizing agent is blended with wet soil in an inert atmosphere and introduced to a decomposition vessel. Air can be added to effect oxidation and/or hydrolysis of oil contaminants. This approach delays hydrolysis of the lime until after blending to favor oxidation/hydrolysis of the organic contaminants, resulting in a non-continuous and relatively slow process.

In U.S. Pat. No. 6,668,947 to Perez, a method for the treatment of contaminated drill cuttings is disclosed. The method includes the treatment of contaminated substrate with a mineral acid and alkaline earth. Treated solids are essentially free of contaminants, and may be disposed of in landfills as non-hazardous waste.

Encapsulation is rarely used for treatment of contaminated substrates because of the high risks involved because there is no guarantee of complete encapsulation, and no guarantee as to the lifetime of encapsulation at the final disposal site. Examples include U.S. Pat. No. 4,913,586 to Gabbita; and U.S. Pat. No. 5,630,785 to Pridemore et al.

Recent encapsulation techniques have included the use of blast-furnace slag and an activating agent for encapsulation of untreated drill cuttings, often carried out within a well-bore annulus. Representative patents include U.S. Pat. Nos. 5,058,679 to Hale, et al., 5,277,519 to Nahm, and 5,341,882 to Hale.

In U.S. Pat. No. 4,880,468, Bowlin et al., disclose disposal of drilling fluids, drill cuttings, and other waste materials in an open pit by solidification of the materials to form cement like solids using hydraulic cement, fly ash, and fumed silica material. The solidification materials help to prevent the waste materials from leaching into surrounding soil. The composition preferably ranges from 60-98% by weight cement, 1-20% fly ash, and 1-20% fumed silica material, and is combined with waste materials in a ratio from 0.3-0.6 $m^3$ (10-20 $ft^3$) of waste material per 45 kg (100 lbs) of solidification material.

In US Pat. App. No. 2003/0192812, Reddoch discloses recycling decontaminated drill cuttings for use as aggregate in road construction, for stone retaining walls, and various landscaping applications. The method of decontamination of the drill cuttings is not given as the method provides an environmentally acceptable process for recycling of the solids.

Once the drill cuttings are treated, disposal of the treated solids is still necessary. In offshore operations, treated solids may be returned to the ocean bed, or can be transported to an alternate site to serve as an artificial reef, depending upon local environmental regulations. On land, treated drill cuttings can retain a residual contaminant concentration preventing reintroduction to the environment. Commonly, treated solids are placed in landfills, pumped into abandoned wells, or re-injected into the earth formation of the well. As costs associated with transportation and reintroduction of solids increases, and landfill availability decreases, alternate disposal methods are needed.

All documents cited herein are hereby fully incorporated in their entireties herein by reference for the purpose of US patent practice and all jurisdictions in which such incorporation is permitted.

SUMMARY OF THE INVENTION

The present invention is directed to the discovery of a method for the production and use of treated drill cuttings, and other oil-contaminated, clay-containing substrates, as activated clays suitable for use as a filtering or absorbing medium, or as a substituent in cement manufacture. The process provides for treating contaminated drill cuttings with a mineral acid and alkaline earth material, preferably under high shear conditions, and in one embodiment at conditions and for a period of time effective to activate clay particles therein. The process is strongly exothermic and rapidly volatilizes organic contaminants from the drill cuttings, e.g. residence times of approximately 60-80 seconds. The present invention achieves rapid and extensive contaminant removal, reliably, efficiently and provides useful disposal of the treated cuttings.

In one embodiment the present invention provides a composition of matter having utility as an activated clay, prepared by the steps comprising: admixing the contaminated substrate with acid, for example mineral acid, under high shear conditions to obtain an acidified admixture; admixing the acidified admixture with alkaline earth under high shear conditions to vaporize volatile contaminants and reaction products; recovering a solid reaction product of reduced contaminant concentration; and heating the solid reaction product to activate clay in the solid reaction product. The mineral acid can be sulfuric acid and the alkaline earth can be lime.

In one embodiment, the heating step can include heating the solid reaction product to a temperature greater than 150° C. In other embodiments, heating can include heating to a temperature greater than 200° C.; greater than 300° C.; greater than 400° C.; greater than 450° C.; greater than 500° C.; greater than 600° C.; greater than 700° C.; greater than 750° C.; or greater than 1000° C. in other embodiments. In certain embodiments, the heating can include heating the solid reaction product to a temperature between 150° C. and 1200° C.; to between 200° C. and 1000° C. in one embodiment; to between 300° C. and 900° C. in another embodiment; or to a range with a lower limit selected from 150° C., 200° C., 300° C., 400° C., 450° C., 500° C., 600° C., 700° C. and 750° C., and an upper limit selected from 900° C., 1000° C., 1100° C. and 1200° C. in other embodiments.

In one embodiment, the treated cuttings can be readily used as activated clay. In another embodiment, the treated cuttings can be used as a raw material for producing activated clays or organoclays. The treated cuttings can be further treated with acid, thermally treated, or a combination of thermal and acid treatment to activate the clay. The treated cuttings can be reacted with organic substrates, such as quaternary ammonium compounds, to form organoclays. The activated clays can be used as a filtering or absorbing medium, as bleaching clay, or in other common applications utilizing activated clays or organoclays. The treated cuttings can also be used in a cement blend.

The decontaminated cuttings can be heated to remove water, for example in a calcining reactor, converting calcium carbonates to calcium oxides. The solids can be combined with cement for the preparation of concrete. In one embodiment the present invention provides a composition of matter having utility as a cement additive, prepared by the steps comprising: admixing the contaminated substrate with a mineral acid under high shear conditions to obtain an acidified admixture; admixing the admixture from (a) with alkaline earth under high shear conditions to vaporize volatile contaminants and reaction products; recovering a solid reaction product from (b) of reduced contaminant concentration; and calcining the solid reaction product from (c). The mineral acid can be sulfuric acid and the alkaline earth can be lime.

In another embodiment of the present invention, a composition of matter having utility as a cement blend is provided. The composition comprises cement clinker material mixed with from 0.1 to 70 parts by weight per 100 parts by weight of the clinker, of treated substrate prepared by a method comprising the steps of: (a) sequentially admixing the contaminated substrate with a mineral acid and then with alkaline earth to recover a solid reaction product of reduced contaminant concentration; and (b) calcining the solid reaction product from (a). In other embodiments, the parts by weight of treated substrate per 100 parts clinker range from 1 to 60, from 5 to 50, from 10 to 40, and from 20 to 30, and other ranges comprising any combination of specified upper and lower limits. Further, the composition can include lime from another source other than the treated substrate and/or wherein the treated substrate is calcined in step (b) with another calcium source material. The cement can include a Portland or blended Portland cement. The reaction product can be calcined in a kiln, and can be calcined to a temperature of at least 500° C. The substrate can be pretreated with an organic emulsion breaker prior to the admixing in (a). The substrate can include drill cuttings. The emulsion breaker can include an organic acid or addition salt. More specifically, the emulsion breaker can include alkylbenzenesulfonic acid, or it can include dodecylbenzenesulfonic acid. The mineral acid can include sulfuric acid, and the alkaline earth can include lime. The blended cement can include between 20 and 35% by weight of the calcined reaction product. The blended cement can include between 25 and 33% by weight of the calcined reaction product. The blended cement can include from 0.01 up to 5% by weight of gypsum. The reaction product and cement clinker can be intimately mixed and ground to a particle size of less than 100 microns.

Another embodiment of the present invention provides a composition of matter, comprising: concrete prepared with the cement blend described above, comprising: a mixture of between 10 and 25% by weight of the cement blend, between 15 and 25% by weight water, and between 50 and 75% by weight aggregate material. The aggregate material can include treated drill cuttings. The mixture can include up to 2% by weight gypsum. The mixture can include between 10 and 20% by weight of the cement blend, between 15 and 20% by weight water, and between 60 and 75% by weight aggregate material.

Another aspect of the present invention provides a method for the preparation of a cement additive from a contaminated substrate, comprising the steps of: (a) admixing the contaminated substrate with a mineral acid to produce an acidified admixture; (b) admixing the admixture from (a) with alkaline earth to produce a reaction product having a reduced contaminate concentration; (c) calcining the solid reaction product from (b). The substrate can include drill cuttings. The mineral acid can include sulfuric acid and the alkaline earth can include lime. The reaction product can be calcined in a kiln at a temperature of at least 500° C.

In another embodiment, the present invention provides a method for preparing a cement blend, comprising: intimately mixing cement clinker with up to 40% by weight of a treated substrate, wherein the treated substrate is produced by sequentially admixing a contaminated substrate with mineral acid and then with alkaline earth to produce a reaction product having a reduced contaminant concentration, and calcining the reaction product; and grinding the reaction product and clinker mixture to produce the blended cement powder.

The blended cement can be ground to a particle size of less than 100 microns. The substrate can include drill cuttings. The mineral acid can include sulfuric acid and the alkaline earth can comprise lime. The method can further include the addition of up to 5% by weight of gypsum, e.g. 0.01 to 5% by weight gypsum.

In another embodiment of the present invention, a method for making concrete is provided, comprising: combining between 10 and 25% by weight of the cement blend produced by the method described above, between 15 and 25% by weight water, and between 50 and 75% by weight aggregate material. The aggregate material can include treated drill cuttings.

In another embodiment of the present invention, an apparatus for treating drill cuttings contaminated with oil for the production of material for use in the preparation of cement is provided, comprising: means for continuously introducing the drill cuttings to an inlet end of a first reactor comprising at least one rotatable shaft disposed longitudinally in a housing and a plurality of impellors spaced along the shaft; means for continuously introducing a mineral acid into the first reactor at a location spaced from an outlet end of the first reactor; means for rotating the at least one shaft of the first reactor to continuously maintain high shear conditions in the first reactor and discharge an acidified intermediate product from the outlet end of the first reactor; means for continuously introducing the acidified intermediate product into an inlet end of a second reactor comprising at least one shaft disposed longitudinally in a housing and a plurality of impellors spaced along the shaft; means for continuously introducing alkaline earth into the second reactor at a location adjacent the inlet end thereof; means for rotating the at least one shaft of the second reactor to maintain high shear conditions in the second reactor to continuously discharge a reaction product from the outlet end of the second reactor essentially free of oil; means for continuously introducing the reaction product to an inlet of a kiln operated at a temperature of at least 500° C.; and means for recovering dehydrated and calcined reaction product from the kiln.

DETAILED DESCRIPTION

Figure 1:
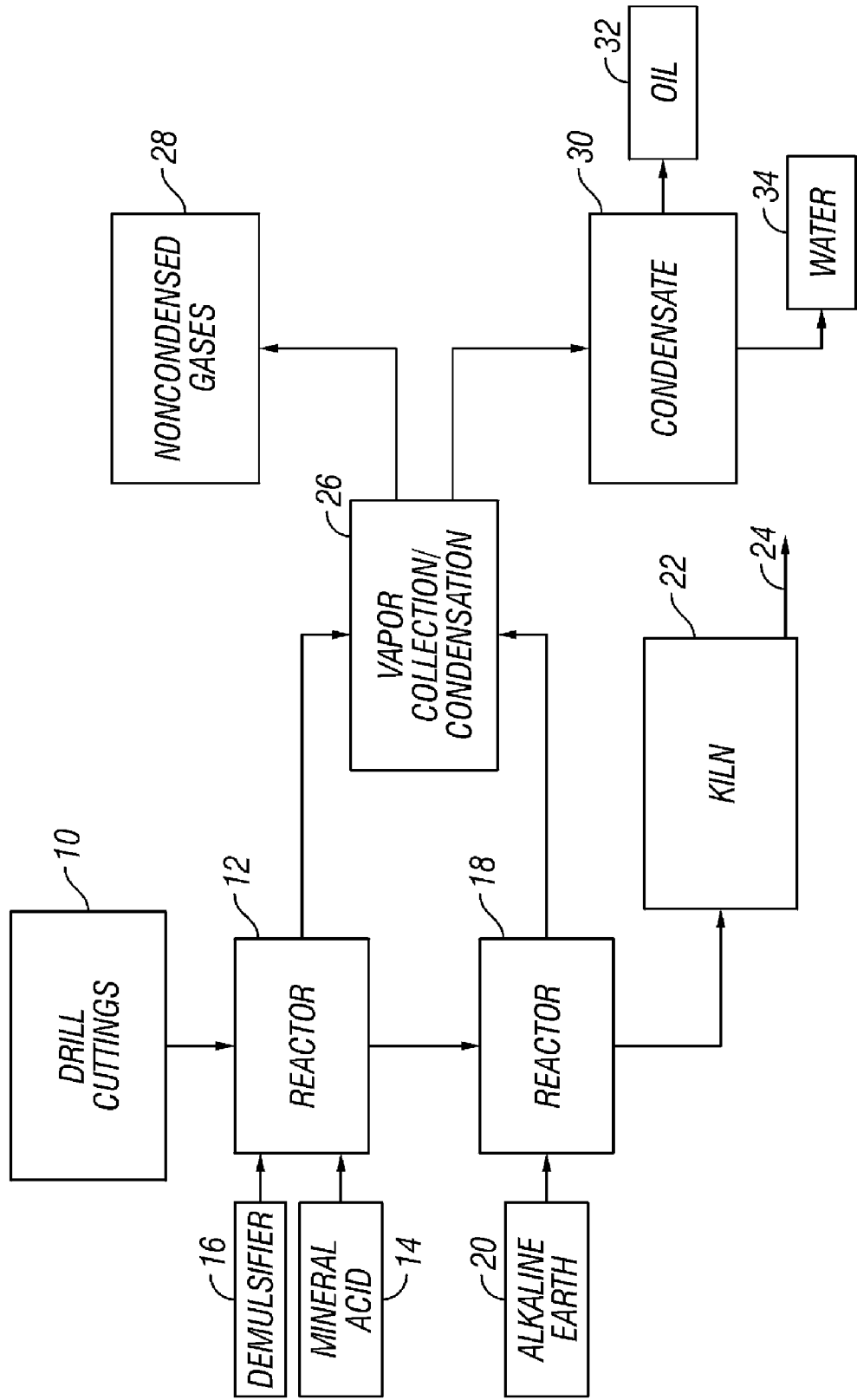
FIG. 1 is a process diagram for the treatment of contaminated drill cuttings for the preparation of activated clays according to an embodiment of the invention.

The present invention relates to the treatment of drill cuttings to provide activated clays useful as filtering or absorbing media, or to provide solid materials useful for the manufacture of cements. The process steps for the decontamination of contaminated substrates applied within this invention include the sequential mixing of the oil-contaminated substrate with mineral acid and alkaline earth. Subsequently, the de-oiled substrate, which can have a high calcium and sulfur content, can be heated to reduce hydration levels and/or to convert carbonates to oxides, such as the conversion of calcium carbonate to calcium oxide for example. The treated cuttings, or optionally the treated and calcined cuttings, are then suitable for use as activated clays.

The addition of the mineral acid chemically conditions the substrate for treatment with the alkaline earth, and can also initiate exothermic reactions to preheat the substrate and drive off volatile compounds. The alkaline earth addition completes a physicochemical transformation of the substrate and further initiates exothermic chemical reactions with the substrate, the mineral acid (as reactant and/or catalyst), and the hydrocarbons to vaporize volatile constituents present in the substrate. Water can facilitate the chemical reaction and aid in vaporization similar to the steam distillation of hydrocarbons, effectively lowering the boiling point of volatile compounds in the substrate. The hydrocarbons react in the solid/liquid mixture and/or in the vapor phase to form lower molecular weight hydrocarbons, oxygenates and/or mineral acid derivatives. The alkaline earth and mineral acid, such as lime and sulfuric acid for example, can also react to form stable solid reaction products, e.g. calcium sulfates, which help stabilize the resultant solid reaction product.

Treatment of Drill Cuttings

Drilling mud is a stable emulsion comprised of several chemical products performing different functions for well drilling, such as temporary casing by the formation of a filter cake, drill bit lubrication and cooling, and removal of cuttings from the bottom to the wellbore. The density of the mud can vary between 900 g/l to 5 kg/l; and all mud constituents remain in suspension during operation. During normal operations, drilling mud and cuttings from the different geological strata are received to be separated from the mud. Drill cuttings at the drill bit and as they travel to the surface, become contaminated with the constituents of the mud. During separation typically by filtration, the mud is recovered for reuse and the drill cuttings recovered for disposal.

A portion of the mud can remain with the cuttings, intimately mixed, emulsified, and with high concentrations of the viscous products, making the cuttings a viscoelastic product. In the cuttings, chemical products are bound up as contaminants, forming a sticky matrix, which is difficult to handle and process for decontamination. Drill cuttings thus present a unique treatment problem because the protective cover formed by the muds can impede penetration of treatment reagents. The residues can be stable solid-liquid dispersions, where the solid phase can be colloidal with thixotropic properties, and the liquid phase can be oil/water.

Although the present invention is described herein with specific reference to drill cuttings as one example, and especially drill cuttings obtained from operations with oil-based drilling muds, other hazardous solid wastes can be treated using the present method and apparatus, especially clay-containing wastes. The clay in the substrate fed to the treatment process can be a silicate, for example, a smectite clay, such as montmorillonite, nontronite, beidellite, bentonite, volkonskoite, laponite, hectorite, saponite, sauconite, magadite, kenyaite, stevensite, vermiculite, halloysite, hydrotalcite, and so on, or a combination thereof. Swellable layered clay materials suitable for the purposes of this invention include natural or synthetic phyllosilicates, particularly smectic clays such as montmorillonite, nontronite, beidellite, volkonskoite, laponite, hectorite, saponite, sauconite, magadite, kenyaite, stevensite and the like, as well as vermiculite, halloysite, aluminate oxides, hydrotalcite and the like. These layered clays generally comprise particles containing a plurality of silicate platelets having a thickness of 8-12 Å tightly bound together at interlayer spacings of 4 Å or less, and contain exchangeable cations such as $Na^+$, $Ca^{+2}$, $K^+$ or $Mg^{+2}$ present at the interlayer surfaces. Drill cuttings can contain large quantities of clay as a result of the shale formations commonly encountered when drilling for oil. Clay is found in various industrial wastes and products, such as, for example, petroleum sludge and wastes and products from the manufacture of ceramics, paper, drilling fluids, certain lubricating oils, insecticides, adhesives, unguents, rubber and plastics, and catalyst or catalyst support.

The present invention utilizes chemical oxidation and/or volatilization of contaminants to reduce contaminant levels below those required for safe environmental disposal. The apparatus can be designed so that the process can be carried out in an automated manner, continuously, reliably and efficiently, as there is minimal energy usage per treated weight unit of drill cuttings. Following treatment according to this invention, the treated drill cuttings or other hazardous waste can be disposed of in landfills as nontoxic, non-hazardous industrial residue, or may be recycled for other applications, for example, as an activated clay or as a component for the manufacture of cement.

Contaminated oil-based drill cuttings can be in the form of a stable emulsion that should be broken before attempting chemical treatment of the drill cuttings. Breaking the matrix of the oil-based drill cuttings can be a physical-chemical process consisting of breaking and separating each component, producing organic (oil) and inorganic (aqueous) liquid phases, and a solids phase. The organic phase can be formed by modifying the polarity of each of the two phases within an aqueous media by the addition of an acid or other emulsion breaker, which can be enhanced with heat, agitation, or both.

The emulsion breaker can be an acidic or polyvalent compound that is capable of breaking a water-in-oil emulsion. Some emulsions associated with drilling cuttings can be easily broken by a strong acid, particularly when the drill cuttings have a relatively high water content (>20 percent), low oil content (<30 percent), and are generally free of large clumps or balls of solids. Emulsions having low water or high oil content, or exhibiting clumping, are not easily broken by a mineral acid alone and may require an emulsion breaker. The emulsion breaker can be an organic acid or addition salt selected from the group including alkylsulfonates, arylsulfonates, alkylarylsulfonates, aralkylsulfonates, or combinations thereof. The emulsion breaker can be selected from the group including an alkylsulfonic acid, arylsulfonic acid, alkylarylsulfonic acid, aralkylsulfonic acid, or a combination thereof. The alkylaromatic sulfonic acids, for example, especially dodecylbenzenesulfonic acid (DDBSA), are materials that can change the polarity of the solution and certain physical properties such as viscosity and interfacial surface tension, without significantly altering chemical properties other than pH. These compounds can be used in small dosages and can be biodegradable or chemically oxidizable without toxic residue for use in environmental projects. In the present invention, the emulsion breaker is preferably an amphiphilic molecule or ion, meaning that a portion of the molecule is hydrophobic (water repellent), and another portion is hydrophilic (attracts water). The hydrophobic (tail) portion can be a hydrocarbon chain, preferably having 12 or more carbon atoms. The hydrophilic (head) portion can be ionic or polar (such as for example, an oxyethylene chain, $-NH_2$, $-SO_2OH$). Within the solution, the emulsion breaker can concentrate at the water/oil interface, whereas hydrophilic heads can be hydrated with water, and hydrophobic tails attracted to oil molecules.

Demulsification can be done in two different manners, in situ, in a reactor or ex situ, before feeding the drill cuttings to a reactor, such as in an open pit at the drilling site, or in a remote location. In either case, the principles are the same and depend more on the demulsifier properties. Because of the specific characteristics of the drill cuttings and muds, different treatments may be required so that generalization is difficult. Some variables to be controlled in emulsion breaking include: (1) type and quantity of demulsifier; (2) pH of the mix; (3) quantity of transfer vehicle (e.g. water); (4) homogenization time; (5) residence time; and (6) temperature of mixture.

The effectiveness of the technique can depend on the characteristics of the contaminated matrix of the cuttings, such as: (1) permeability; (2) porosity; (3) homogeneity of the medium; (4) texture; and (5) mineralogy. Although the temperature of the mixture can be an important factor in breaking the organic phase, demulsifiers such as alkylbenzenesulfonates, preferably in acid form, i.e. alkylbenzenesulfonic acids such as dodecylbenzene sulfonic acid (DDBSA), work at ambient temperature, eliminating the need for heating. Linear and/or branched alkylbenzenesulfonic acids may also be used.

Preferably, the addition of the demulsifier can result in essentially complete breaking of the emulsification without using more demulsifier than is necessary. Excess demulsifier can require additional alkaline earth, as described below, and can adversely affect the economics of the process. In most applications, the proportion of emulsion breaker can range from 0.5 to 5 parts by weight per 100 parts of substrate (pph), preferably from 1 to 3 pph, and especially from about 1 to about 1.5 pph. If the pH is low, 9 for example, the optimum quantity of DDBSA may be 1 pph; however, if the pH of the same or similar matrix is high, 13 for example, the optimum quantity may be 1.5 pph.

The emulsion breaker can be added as a neat liquid or solid. Depending on its physical state at ambient temperature, the emulsion breaker may require heating and/or dilution for liquefaction. In this manner, water can be added with the emulsion breaker. For example, the emulsion breaker can be added to the cuttings as a solution containing from 5-10 weight percent of DDBSA.

The invention can be applicable to wastes containing clay. When clay contacts organic compounds and water, its physical-chemical behavior can be altered, leading to unpredictable results and the formulation of extremely stable dispersions, which become stable in water or soil, where chemical compounds which form ions in aqueous solution, can be found.

The peptizing of the clay constituent of oil-based drill cuttings is a physical-chemical process in which the clay can be induced by the added heat, mineral acid and/or lime to expand. The increased volume facilitates the disintegration or dispersion of agglomerated particles. The process can include initial treatment with DDBSA when the drill cuttings are sticky, as in high oil/low water mixtures, and subsequent treatment with mineral acid, alkaline earth and heat. Peptizing generally does not break the molecules, or flocculate the components of the mixture. Chrome salts, manganese, and iron are preferably avoided. With acidification, the solid phase can be activated to develop its colloidal properties and effect exfoliation or pillaring.

The application of mineral acid effects nearly complete oil removal without using more acid than is necessary. Sufficient acid must be used to complete emulsion breaking, pretreat the clay for lime addition, and obtain the heat of reaction (primarily through reaction with the lime) necessary to assist in the volatilization of the oil. Some consumption of the mineral acid by reaction with alkaline earth and metal constituents may occur in the drill cuttings, especially with a high pH drilling mud. Excess acid may require additional lime, as described below. The mineral acid can be diluted to achieve the desired result, but is preferably concentrated or undiluted. The mineral acid addition preferably ranges from 1-20 pph, more preferably from 2-13 pph, and especially from 4-7 pph. Suitable mineral acids include sulfuric acid, phosphoric acid, nitric acid, and the like, or combinations thereof. Sulfuric acid is particularly preferred.

Due to the temperatures generated by the exothermic nature of the acid addition to the clay-oil substrate, as well as in the subsequent alkaline earth addition, most water present in the cuttings and added with the emulsion breaker and/or mineral acid can be vaporized. Excess water can suppress the reaction temperature to the point that the volatilization of contaminants may be adversely affected or prevented, and the end product may contain undesirably high levels of moisture and/or hydrocarbons. If too little water is added, the emulsion may not be adequately broken, the mineral acid treatment may not be effective, the alkaline earth reactions may not be adequately promoted and/or the treated product may be too dry and cause dusting. As a practical matter, the water added with the emulsion breaker can be adjusted until the desired degree of hydration of the treated drill cuttings is achieved. If the product is too dusty, water can be added, and if it is too wet, less water can be added. The water preferably can be added with the emulsion breaker and/or the mineral acid, or may be added separately. The proportion of water in the drill cuttings following addition of the emulsion breaker is preferably from 20-40 pph.

Material conditioning refers to the maximum moisture content in the finished product, and is preferably not less than 3% by weight so handling and final disposition are facilitated. The conditioning of the finished product can be part of the invention since the initial product can have a higher moisture content, and the finished product can be an easily handled dry powder, allowing for transporting and final disposal or use. The specific gravity of typical oil based drill cuttings can be transformed, for example, from 2.2 at the input to approximately 1.1-1.2 in the treated cuttings. Water content of the treated solids can be controlled to avoid dusting and the need for post-treatment processing such as spraying water/surfactant onto the treated solids as is necessary in some prior art processes.

In general, the objective of the alkaline earth addition step is to at least partially, to essentially, and/or to completely detoxify waste or hydrocarbon saturated material by exothermic reactions, including oxidation, to volatilize and vaporize the hydrocarbon constituents. For example, organic compounds can generally be converted into volatile or vaporizable oxygenates such as alcohols, ketones, aldehydes, carboxylic acids, carbon dioxide, and water. Low molecular weight organic compounds can be removed from drill cuttings by a process that is essentially steam distillation, due to the heat generated by the exothermic acid-lime addition reactions. When sulfuric acid is used, volatile sulfonates can be formed, and oxygenation reactions can be catalyzed. Heating to assist in the vaporization and/or reaction may be supplied by externally heating the reactor vessels, e.g. by steam jacketing, and/or by preheating the drill cuttings and/or the acid/lime additives, although it is usually sufficient to conduct the process in an insulated or adiabatic vessel(s) with short residence time to minimize relative heat losses.

Oxidation-reduction reactions occur in pairs, as one compound oxidizes another is reduced. In the treatment of hazardous wastes, the oxidizing agent oxidizes the wastes which, in turn, function as reducing agents. In one embodiment of the present invention, the inorganic acid, and especially the organic acid, can function as oxidizing agents to oxygenate hydrocarbons in the drill cutting matrix or the recovered vapors. The oxidizing agents can be non-specific and can react with other reducing agents in the waste material. If there are large quantities of organic molecules in the wastes, corresponding amounts of oxidizing agents may be required for chemical oxidation. Initial determination of hydrocarbons concentration is advisable. Preferably, the acid and lime are added in the required amounts so process costs may be minimized, although as a practical matter an excess of reactants can be used to ensure essentially complete removal of the hydrocarbons or to facilitate activation of the clay. For typical oil-based drill cuttings, from 1 to 16 pph, preferably from 2 to 10 pph, and especially from about 3 to about 6 pph of alkaline earth, preferably lime, are used.

FIG. 1 shows a diagram of the treatment process for oil-based drill cuttings, indicating different steps of the process, including addition of the three different reagents, using previously mentioned principles for the three functions. The process begins with addition of drill cuttings 10, and mineral acid 14, in specified quantities, to react in reactor 12. If necessary, an emulsion breaker 16 can be added to reactor 12. The partially treated drill cuttings are introduced into reactor 18, where a specified amount of alkaline earth 20 is added, completing the process. The treated cuttings are discharged from reactor 18 and can be supplied to kiln 22, which can heat the solids to an elevated temperature, such as greater than 150° C., for example; a temperature of greater than 500° C. can be utilized for purposes of calcining the product. Other temperatures such as those mentioned above can be used, and can depend on process economics as well as the degree of peptizing and/or activation desired, for example. For example, a surface area of 20 $m^2$/g might be obtained at 400° C. for a particular clay substrate, whereas a surface area of 40 $m^2$/g might be obtained by heating the same clay for the same period of time at a temperature of 500° C. To avoid the formation of clinkers that can occur at higher temperatures, the heating preferably does not exceed 1200° C., more preferably 1000° C., and especially 900° C. The calcined product 24 can then be disposed of, used as activated clay, or used in the manufacture of cement. The chemical reactions that occur are exothermic and by-products are primarily oxygenated organic compounds and water gases. Calcium and sulfur containing compounds, such as for example, calcium carbonates and sulfates, may be formed during treatment. The process can include a vapor collection system 26 and a condenser, and the noncondensed gases 28 can be vented. If desired, the condensate 30 from vapor collection/condensation system 26 can be separated into oil and water phases 32, 34.

In another embodiment, the treated cuttings discharged from reactor 18 can be supplied to kiln 22, which can heat the cuttings to an elevated temperature, peptizing the clay and increasing the surface area of the clay. In one embodiment, the clay in the contaminated drill cuttings can have a surface area of between 0.5 and 4 square meters per gram, and the peptized clay recovered from kiln 22 can have a surface area greater than 20 square meters per gram. Heating in kiln 22 can remove water from the clay, increasing the pore volume of the clay. The recovered clay can be pillared and/or modified to form an organoclay by substituting the metal cations with organic compounds, such as quaternary ammonium compounds for example. An additional function of the heating in the kiln is to volatilize or carbonize any oligomers or polymers not reacted or volatilized during treatment of the contaminated substrate.

The treated and calcined product from the kiln can include activated clays and other components, minerals, or metals such as silt, feldspars, mica, chlorite, opal, fossil fragments, heavy minerals, and many other rock and mineral particles ranging upward in size from colloids to pebbles. The peptized clays can be separated from the other components based upon density, such as by using a vibrating and/or rotating screen or by flotation techniques.

Figure 2A:
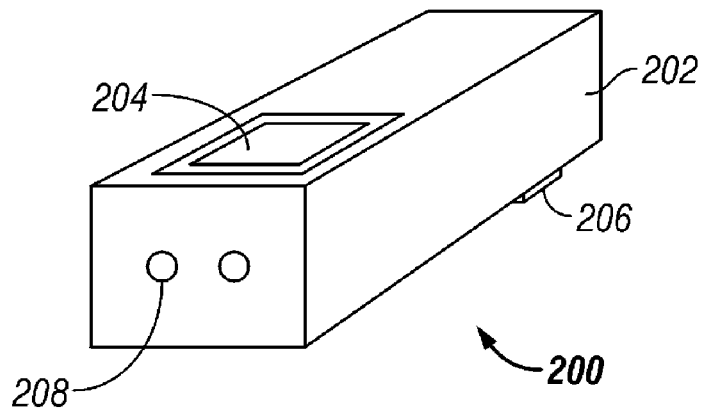
FIG. 2A shows a perspective view of one of the reactor housings according to one embodiment.
Figure 2B:
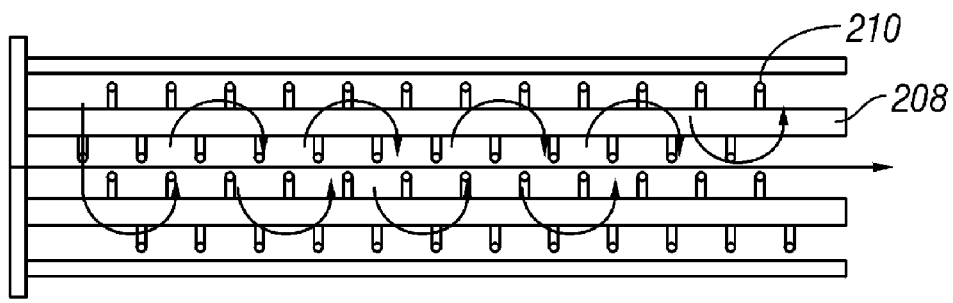
FIG. 2B schematically shows the horizontal flow pattern inside the reactor housing of FIG. 2A.
Figure 2C:
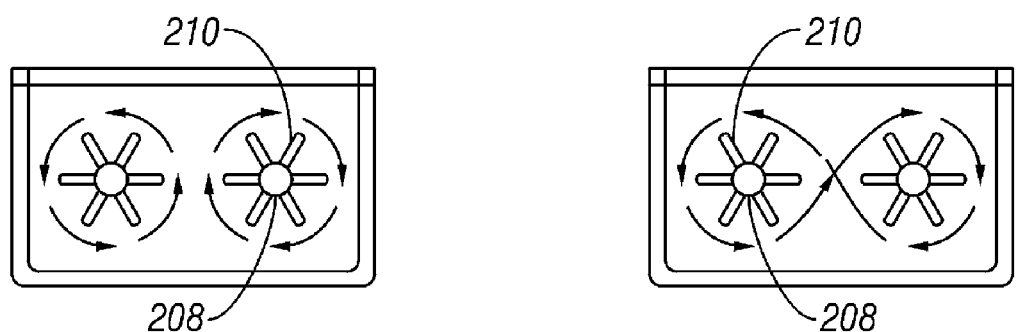
FIG. 2C shows the vertical flow patterns inside the reactor housing of FIG. 2B.

FIG. 2A shows a perspective view of a housing for reactor 200, which can be used for either of reactor 12 or 18, which can have the same general dimensions and construction. FIGS. 2B and 2C, respectively, show a schematic plan view of the movement of material in reactor 200, and a schematic elevation of the movement of material in the reactor 200. The reactor 200 includes a housing 202, an inlet opening 204 in an upper surface at one end of the reactor 200, and a discharge opening 206 in a lower surface at the other end of the reactor 200. A pair of shafts 208 can be longitudinally aligned in the housing 202 and can be rotatable in opposite or complementary directions. A plurality of impellers 210 in the form of pins can be positioned along the length of the shafts 208. The arrows in FIGS. 2B and 2C show the horizontal and vertical direction of the movement of the materials. If desired, baffles (not shown) may be positioned between adjacent impellers 210. The internal design and construction materials of the reactors can resist the extreme pH environments within the process, e.g. stainless steel alloy. The drill cuttings and the reagents preferably follow three different movements simultaneously: (a) circular motion on the vertical plane; (b) linear-transverse motion (U type); and (c) longitudinal linear motion along the reactors, allowing for the input and output volumes and speeds to be the same. The speed of the impellers and construction materials used to manufacture the reactors prevent the viscoelastic matrix from sticking to the walls of reactor. The moving speed at the tip of the impellers can be at least 4 meters per second on rotation and 0.2 meters per second on the translation in both directions (U and linear). In a reactor treating 30 metric tons per hour of drill cuttings (15 m$^3$/h), the reactors can have twin parallel shafts approximately 3.6 meters (12 feet) long with 74 paddles/shaft and a 46 cm (18-in.) diameter. The total reaction (residence) time preferably does not exceed 60-80 seconds inside the two reactors (i.e. 30-40 seconds per each reactor).

The reaction processes require vigorous agitation. Preferably, the energy for agitation desirably does not exceed 1 kW (1.5 hp) per each metric ton of treated matrix per hour. For example, to treat 30 metric tons per hour of contaminated drill cuttings, the total power required should be 34 kW (45 hp) or less. This process takes place at a pressure slightly higher or preferably slightly lower than atmospheric, thus, a pressure vessel is not required. The materials of construction of the reactor 200 internals are preferably a high nickel stainless steel alloy that is resistant to corrosion at the pH extremes and the temperatures experienced.

There are some applications where the footprint available to treat contaminated drill cuttings is limited, such as offshore platforms. Under these circumstances, the reactors can be adapted to an alternate arrangement; such as in a vertical position with the same operational conditions as the horizontal position.

The solids feeders of the reactors are preferably rotary feeders to inhibit the entry of air into the reactors which might otherwise tend to reduce the reactor temperature. Alternatively, a spring-biased damper (not shown) can be used to inhibit air entry into the system.

The equipment can be installed permanently or in portable units or modules for temporary applications. In addition to the reactors, other peripheral or secondary equipment is needed as per the handling and metering out of materials. The equipment can include hoppers, tanks, feed-meters, pumps, and conveyors of different types. The process can be continuous to achieve maximum equipment efficiency, lower energy consumption, and lower production costs. The process can be automatic to insure consistency and unitary process control.

The treated drill cuttings can be disposed of as non-hazardous waste, or alternatively can be used as activated clays or in the preparation of cement, both of which recycles the drill cuttings without the need for disposal in a landfill. Treatment of the substrate with the emulsion breaker, mineral acid and lime, while volatizing hydrocarbons and other volatile organic compounds present, may also result in the formation of calcium and sulfur containing compounds, preferably calcium carbonates and sulfates.

Activated Clays from the Treated Drill Cuttings

Smectite clays do not naturally have sufficient activity to be commercially valuable, and therefore must undergo an activation process. Attapulgite clays are naturally active, possessing a natural high porosity and electrical imbalance; however, some applications require a certain degree of acidity in the process environment. A mixture of attapulgite and hormite can result in a three-dimensional, highly porous structure which has a high natural activity. Kaolin clays, typically used in catalysts and not as bleaching clay, are typically thermally activated at temperatures in excess of 1000° C. Thus, the method of activation varies depending upon the clay type.

Drilling mud and cuttings from the different geological strata are received and separated from the mud during drilling operations. The drill cuttings from the different strata include clay, shale, and other minerals and rocks. Additionally, the drilling mud, imperfectly separated from drill cuttings, often contains bentonite. The drilling muds and drill cuttings, which can vary in particle size, are generally separated by filtration, as noted above, or by settling. The treated drill cuttings produced from the different strata can be separated based upon the data normally obtained during drilling, thus producing the desired clay or mixture of clays. Thus, the clays resulting from the treated drill cuttings obtained from the above described treatment process can be directly utilized as activated clays or can be used as a source of raw materials for activated clays, requiring a further activation step. In another embodiment, the activated clays can be used as an additive for drilling mud, used in addition to or replacing a portion of the bentonite or barite clays typically used in drilling fluids or drilling mud.

For example, while drilling for oil, the drill passes through a layer of hormite, an attapulgite clay. The drilling process necessarily results in small hormite clay particles such that the clay will flow up the drillstring with the circulating drilling muds. The drilling mud and drill cuttings are separated, resulting in a mixture of hormite with bentonite and hydrocarbons from the drilling mud. The drill cuttings comprising bentonite and hormite are treated by the drill treating process as described above. The treatment process, through contacting the clays with mineral acid, separates the hydrocarbons from the mixture and removes metal ions from the crystalline structure of the clays, resulting in an activated clay mixture due to the natural activity of the hormite. Should additional activity be desired from the mixture, an excess of acid can be used.

As another example, while drilling for oil, the drill passes through a layer of montmorillonite, a smectite clay. The drilling mud and drill cuttings are separated, resulting in a mixture of montmorillonite with bentonite and hydrocarbons from the drilling mud. The drill cuttings comprising bentonite and hormite, both smectite clays, are treated by the drill treating process as described above. The treatment process, through contacting the clays with mineral acid, separates the hydrocarbons from the mixture. The smectite mixture can be activated by further contact with mineral acid under controlled temperature conditions. The active smectite mixture is then suitable for use as bleaching clay or other common uses.

In another embodiment, the clay recovered from the treated drill cuttings can undergo thermal treatment and can be reacted with quaternary organic compounds to result in organically modified clay.

As a further example, kaolin clay recovered from the treated drill cuttings can undergo thermal treatment, at elevated temperatures, to result in an activated clay useful as a catalyst, such as for the cracking of hydrocarbons.

As illustrated herein, the drilling process and treatment method can save in the cost of mining, grinding, and transportation costs associated with the raw materials for activated clays. Additionally, the treatment process can enable the activation of certain types of clays, resulting in cost savings during the activation process due to decreased acid use and reduced washing requirements. A further improvement in the activity of the clay is also realized due to the steam produced during the treatment process, improving the effect of the acid on the clay structure, increasing the surface area and porous space of the clays. Pillared clays can also be formed by the insertion of large cation structures into the clay interlayer through cation exchange.

Use of Treated Cuttings as a Cement Additive

Cement is a combination primarily consisting of calcium, silicon, aluminum, and iron. Common materials used in the preparation of cement can include limestone, shells, and chalk or marl, combined with shale, clay, slate, or blast furnace slag, silica sand and iron ore. These compounds are generally mined, crushed and heated to high temperatures in the preparation of cement. Many of these materials, especially shale and clay, can be found in drill cuttings. In addition, the treatment with lime results in the presence of calcium compounds which may enhance suitability for addition in the manufacture of cement. Portland cement is the basic ingredient of concrete and can consist of approximately 85% by weight lime and silica.

Portland cement is generally produced by obtaining raw earth materials, heating them to temperatures of approximately 1500° C. (approximately 2700° F.), and crushing the heated raw materials to produce a powder material. As the material is heated in the kiln, elements, including water, are driven off in the form of gases. The heating process in the kiln can reduce moisture content in the ground materials from an initial concentration of between 1 and 50% by weight, to less than 1% by weight. Generally, raw materials for the manufacture of Portland cement can include combinations of limestone, shells, chalk, shale, clay, sand, and iron ore, although other materials having similar chemical compositions may also be used. The materials are typically reduced to a crushed or powdered state and heated to remove moisture contained within the raw earth materials. At temperatures of approximately 1500° C., chemical reactions cause the materials to fuse, creating marble sized pellets known as clinker. Cooled clinker is combined with up to 5% by weight gypsum and ground to a fine powder, preferably having a particle size such that nearly all the powder passes through a 75-micron sieve. The powder product is Portland cement and can then be combined with aggregate and water to form concrete, as is known in the art.

Blended cements can be produced by intimately blending two or more types of cementitious material. Primary blending materials can include Portland cement, ground granulated blast furnace slag, fly ash, natural pozzolans, and silica fume. Blended cements are generally used in the same manner as Portland cements, and are well known in the art. For purposes of the present invention, the treated drill cuttings can be added to Portland cement or any combination of blended cement materials specified above and known in the art. In addition, pozzolans, slags, fly ash and silica fume can be added to achieve the desired properties of the concrete product.

While a major portion of the moisture present in the drill cuttings is removed in the form of steam, the treated cuttings may be subsequently heated in a kiln to remove remaining free water molecules, crystallized water, and to convert calcium carbonates present to calcium oxides. In the kiln, the following reactions take place: (1) evaporation of free water; (2) release of combined water from the clay; (3) decomposition of magnesium carbonate; (4) decomposition of calcium carbonate (calcinations); and (5) combination of the lime and clay oxides. Preferably, the process takes place in a lime kiln, which is an enclosed combustion device used to calcine lime mud, consisting primarily of calcium carbonate, into calcium oxide.

Drill cuttings however do not require the high temperatures as required in the manufacture of cement, and is preferably heated to temperatures of between 500 and 700° C. (930-1260° F.), more preferably approximately 600° C. (1110° F.), although higher temperatures can also be employed. The use of higher temperatures however may result in the decomposition of sulfur containing compounds, producing sulfur oxides, and removing any sulfates and/or sulfonates that may be used to replace gypsum in the cement manufacture process. A lime kiln, employing temperatures in the ranges listed above, may be ideally suited for the heating of the treated drill cuttings. Because lower temperatures are used, operating costs for the production of the cement are also lowered.

The drill cuttings, having been decontaminated by methods described in the present invention, or other like processes, and having been calcined and reduced in size in the kiln, can be added to the cement in a ratio of from 30-40% by weight drill cuttings and from 60-70% by weight cement.

The presence of sulfates and other sulfur containing compounds in the drill cuttings, as a result of the use of sulfuric acid and sulfur containing emulsion breakers, may reduce the amount of gypsum required, such as for example, in the preparation of typical Portland cement, in which up to 5% by weight gypsum is typically added. Generally, gypsum and clinker are ground together in controlled amounts in the formation of the finished cement product. Typically, the gypsum concentration of the mixture effects the setting time, or hardening rate, of the cement and/or concrete.

The preparation of concrete typically requires between 10-15% by weight cement, or cement/drill cutting mix; 15-20% by weight water; and 60-75% by weight aggregate material. The aggregate material typically can consist of crushed stone, sand, or like material, and can also include treated drill cuttings. Entrained air in many concrete mixes can comprise up to 5-8% of the mixture. When cement and water are combined, the mixture forms a paste that begins to harden as the cement particles begin to re-hydrate. Strength of the concrete is determined by the composition of the paste, which is measured by the ratio of water to cement. While crushed rock or stone is typically used as the aggregate material, appropriately sized drill cuttings taken from the appropriate strata and previously decontaminated, can also be used. As stated previously, the treated drill cuttings can often include shale, sand and other materials typically used as aggregate in the preparation of concrete.

After describing this invention in detail above, the ordinarily skilled artisan will be able to make many changes and modifications without departing from the spirit of the invention. All these changes and modifications are contemplated as being within the scope and spirit of the appended claims.

What is claimed is:

1. A method, comprising:
   admixing a contaminated substrate with a mineral acid under high shear conditions to obtain an acidified admixture;
   admixing the acidified admixture with alkaline earth under high shear conditions to vaporize volatile contaminants and reaction products and form a solid reaction product of reduced contaminant concentration;
   heating the solid reaction product to a temperature above 150° C.; and,
   recovering the heated product.

2. The method of claim 1 comprising admixing the solid reaction product with mineral acid prior to the heating.

3. The method of claim 1 wherein the heating comprises heating the solid reaction product to a temperature between 200° C. and 1200° C.

4. The method of claim 1 wherein the heating comprises heating the solid reaction product to a temperature between 300° C. and 1000° C.

5. The method of claim 1 comprising separating the recovered product to form an activated clay product and a decontaminated substrate.

6. The method of claim 5 wherein the activated clay and decontaminated substrate are separated based upon density.

7. The method of claim 5 comprising reacting the clay with an organic compound to form an organoclay.

8. The method of claim 1 wherein the heating comprises calcining the solid reaction product.

9. The method of claim 8 wherein the calcining comprises heating the solid reaction product to a temperature greater than 500° C. and less than 1000° C.

10. The method of claim 1 wherein the substrate comprises drill cuttings.

11. The method of claim 1 comprising pretreating the substrate with an organic emulsion breaker prior to the mineral acid admixing.

12. The method of claim 11 wherein the emulsion breaker comprises alkylbenzenesulfonic acid.

13. The method of claim 11 wherein the emulsion breaker comprises dodecylbenzenesulfonic acid.

14. The method of claim 1 wherein the mineral acid comprises sulfuric acid.

15. The method of claim 1 wherein the alkaline earth comprises lime.

16. A method, comprising:
admixing a contaminated substrate with a mineral acid under high shear conditions to obtain an acidified admixture;
admixing the acidified admixture with alkaline earth under high shear conditions to vaporize volatile contaminants and reaction products and form a solid reaction product of reduced contaminant concentration;
heating the solid reaction product to a temperature above 150° C.; and
recovering the treated product, wherein the product comprises an activated clay.

17. The method of claim 16 further comprising incorporating the activated clay in a filter medium.

18. The method of claim 16 further comprising incorporating the activated clay in a bleaching clay.

19. The method of claim 16 further comprising incorporating the activated clay in a drilling mud.

20. A method, comprising:
(a) sequentially admixing a contaminated substrate with a mineral acid and then with alkaline earth to recover a solid reaction product of reduced contaminant concentration;
(b) calcining the solid reaction product from (a); and
(c) mixing the calcinated product with cement clinker material at a ratio from 0.1 to 70 parts by weight of the calcinated product per 100 parts by weight of the clinker material.

21. A method, comprising the steps of:
(a) admixing the contaminated substrate with a mineral acid to produce an acidified admixture;
(b) admixing the admixture from (a) with alkaline earth to produce a reaction product having a reduced contaminate concentration;
(c) calcining the solid reaction product from (b).

22. A method, comprising:
sequentially admixing a contaminated substrate with mineral acid and then with alkaline earth to produce a reaction product having a reduced contaminant concentration;
calcining the reaction product;
intimately mixing cement clinker with from 0.1 to 70 parts by weight per 100 parts by weight of the clinker of the calcined reaction product; and
grinding the reaction product and clinker mixture to produce cement powder.

* * * * *